United States Patent [19]
Chuang

[11] Patent Number: 5,836,491
[45] Date of Patent: Nov. 17, 1998

[54] LOCK SECURING DEVICE FOR A BICYCLE

[76] Inventor: Louis Chuang, 7F-8, No. 20, Ta Lon Road, Taichung, Taiwan

[21] Appl. No.: 937,503

[22] Filed: Sep. 25, 1997

[51] Int. Cl.[6] .................................. B62J 7/04; B62J 11/00
[52] U.S. Cl. ......................... 224/456; 224/454; 224/443; 224/935
[58] Field of Search .................................. 224/935, 454, 224/456, 459, 461, 443; 70/233

[56] References Cited

U.S. PATENT DOCUMENTS

| | | | |
|---|---|---|---|
| 5,251,796 | 10/1993 | Shelhart | 224/935 |
| 5,395,016 | 3/1995 | Minoura | 224/935 |
| 5,551,609 | 9/1996 | Best | 224/935 |

Primary Examiner—Linda J. Sholl
Attorney, Agent, or Firm—Charles E. Baxley, Esq.

[57] ABSTRACT

A lock securing device for a bicycle which has a rack and the lock securing device includes a frame disposed to the rack and having a tubular member disposed to an underside thereof, two hook portions respectively extending from two ends of the frame. A quick-release device includes a handle pivotally connected to an activating rod which is movably inserted through the tubular member and threadedly connected to an adjusting member. The handle has a curved tongue extending laterally therefrom so as to support a head of the lock and a U-shaped body of the lock is supported by the first hook portions.

3 Claims, 4 Drawing Sheets

LOCK SECURING DEVICE FOR A BICYCLE

BACKGROUND OF THE INVENTION

1. Field of the Invention

The present invention relates to a securing device and, more particularly, to an improved securing device disposed to an underside of a bicycle rack for securely position a U-shackle lock.

2. Brief Description of the Prior Art

U-shackle locks are used for bicycles for a long time and some bicycles have a special securing device for securely positioning the U-shackle lock. Usually, the securing device is disposed to a down tube, a top tube or a seat tube of the bicycle so that a head portion of the U-shackle lock is clamped by the securing device. However, there are other accessories are needed to be disposed to the down tube, the top tube or the seat tube, for example, a water container, a tire pump or a bag. Therefore, a user has to take a lot of time to arrange all the accessories mentioned above on the top tube, the down tube and the seat tube. Furthermore, the U-shackle lock has to be securely positioned on either one of the three tubes mentioned above by a proper positioning device, this means when the user takes the lock from the tube, a lot of processes should be taken to release the positioning device. Obviously, it is not convenient enough and does not meet requirements of the user. Especially in some areas or countries, people are warned that the bicycles have to be locked if the users cannot stay near to their bicycles.

Therefore, there has been a long and unfulfilled need for a lock securing device which is easily to be used and disposed to a position other than the top tube, the down tube and the seat tube.

SUMMARY OF THE INVENTION

In accordance with one aspect of the present invention there is provided a lock securing device for a bicycle and comprising a frame being able to be disposed to a rack of the bicycle and having a tubular member disposed to an underside thereof. The frame has two hook portions respectively disposed to two ends thereof. A quick-release means has a handle having two lugs extending from one of two ends thereof and each of the lugs having an eccentric hole defined therethrough so as to form a protrusion portion, a curved tongue extending laterally from the handle, an activating rod having a first end thereof pivotally connected between the two lugs and a second end thereof with an outer threaded periphery, an engaging member movably mounted to the activating rod and having a curved surface for receiving the protrusion portions.

An adjusting member is threadedly engaged with the outer threaded periphery of the activating rod which is inserted through the tubular member.

It is an object of the present invention to provide a lock securing device disposed to an underside of a rack.

It is another object of the present invention to provide a lock securing device which is easily to be operated.

It is a further object of the present invention to provide a U-shackle lock securing device disposed to the underside of the rack.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
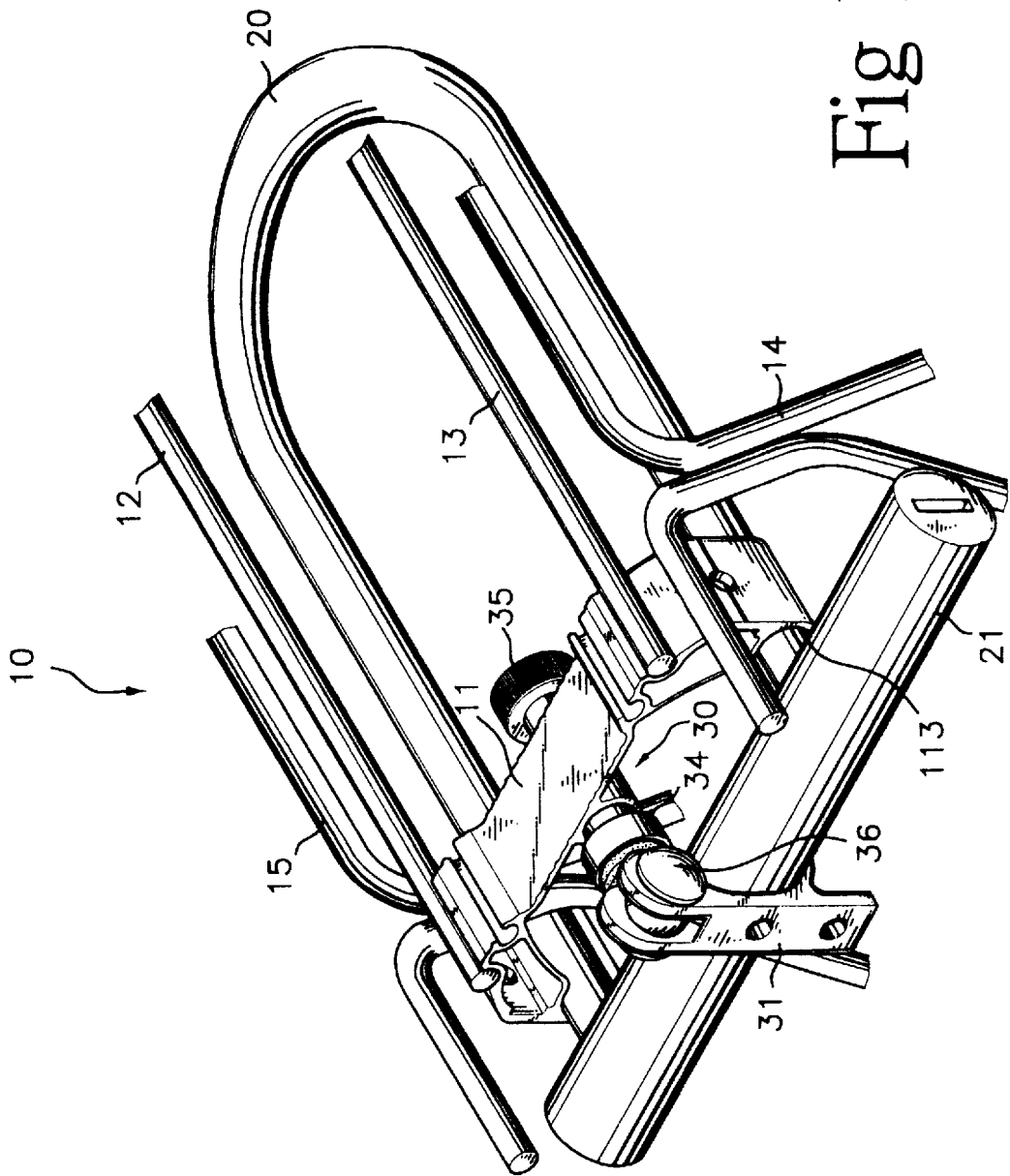
FIG. 1 is a perspective view of a lock securing device in accordance with the present invention disposed to a rack of a bicycle.
Figure 2:
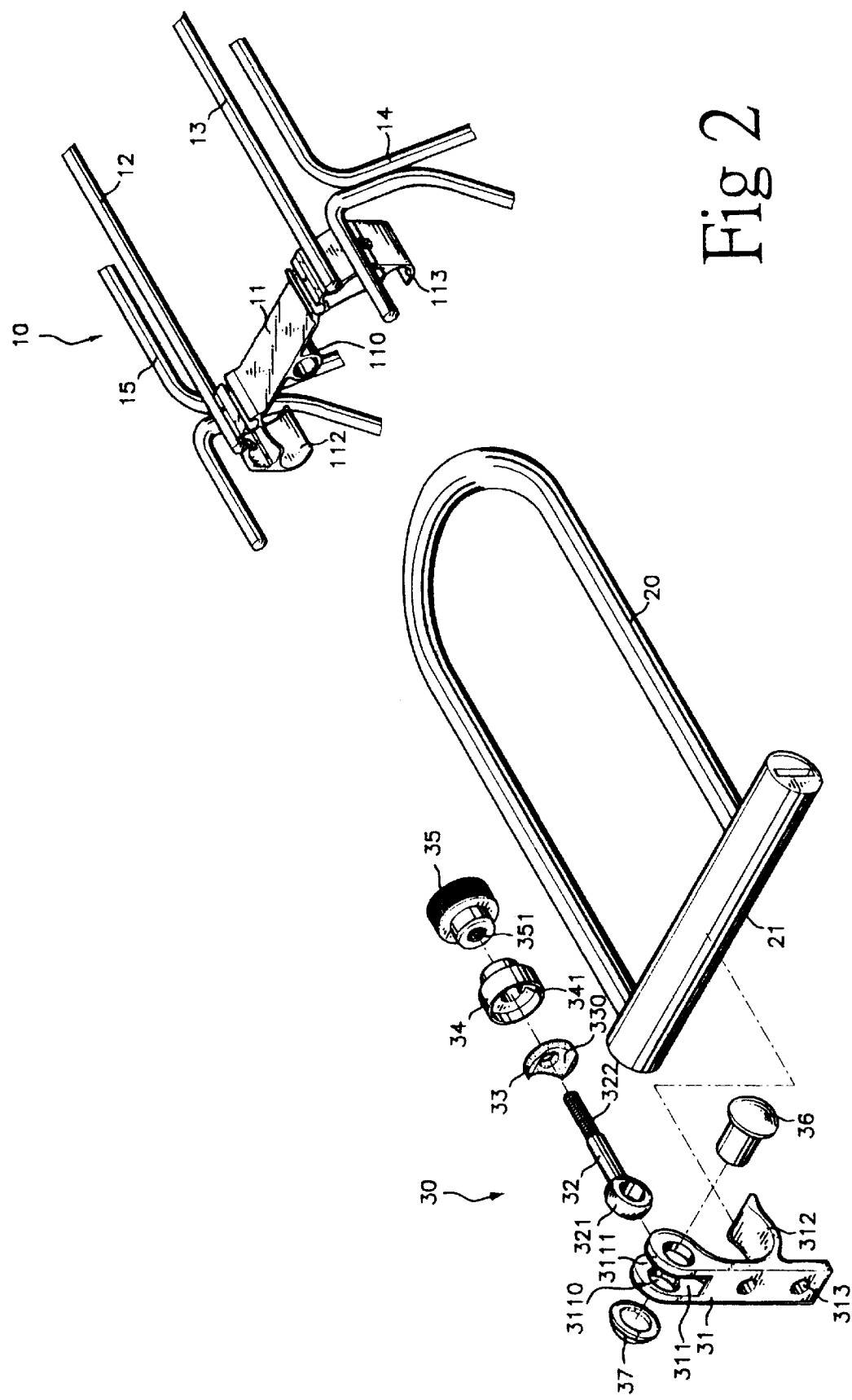
FIG. 2 is an exploded view of the lock securing device and the rack in accordance with the present invention.

Referring to the drawings and initially to FIGS. 1 and 2, a rack 10 of a bicycle includes at least two parallel rails 12, 13 and two connecting rods 14, 15 respectively extending from the rails 12, 13 to connect to an axle of rear wheel hub (not shown). A frame 11 is connected between the two rails 12, 13 of the rack 10 of the bicycle and has a tubular member 110 disposed to an underside thereof. The frame 11 has two hook portions 112, 113 respectively disposed to two ends thereof. A U-shackle lock includes a tubular head portion 21 and a U-shape body 20 which is unlockably connected to the head portion 21.

A quick-release means 30 has a handle 31 which has two lugs 311 extending from one of two ends thereof and each of the lugs 311 has an eccentric hole 3110 defined therethrough so as to form a protrusion portion 3111. A curved tongue 312, preferably made by flexible material, extends laterally from the handle 31 and is located near the other end of the handle 31. An activating rod 32 has a first end thereof pivotally connected between the two lugs 311 by a rivet 36 and an end cap 37, and a second end thereof with an outer threaded periphery 322 which is movably inserted through the tubular member 110. An engaging member movably mounted to the activating rod 32 includes a washer 33 and a receiving member 34 which has a recess 341 defined in an end thereof for receiving the washer 33 therein. The washer 33 has a curved surface 330 defined in one end thereof for receiving the protrusion portions 3111 of the lugs 311 when the handle 31 is pivoted upwardly.

An adjusting member 35 is threadedly engaged with the outer threaded periphery 322 of the activating rod 32 extending through the tubular member 110.

Figure 3:
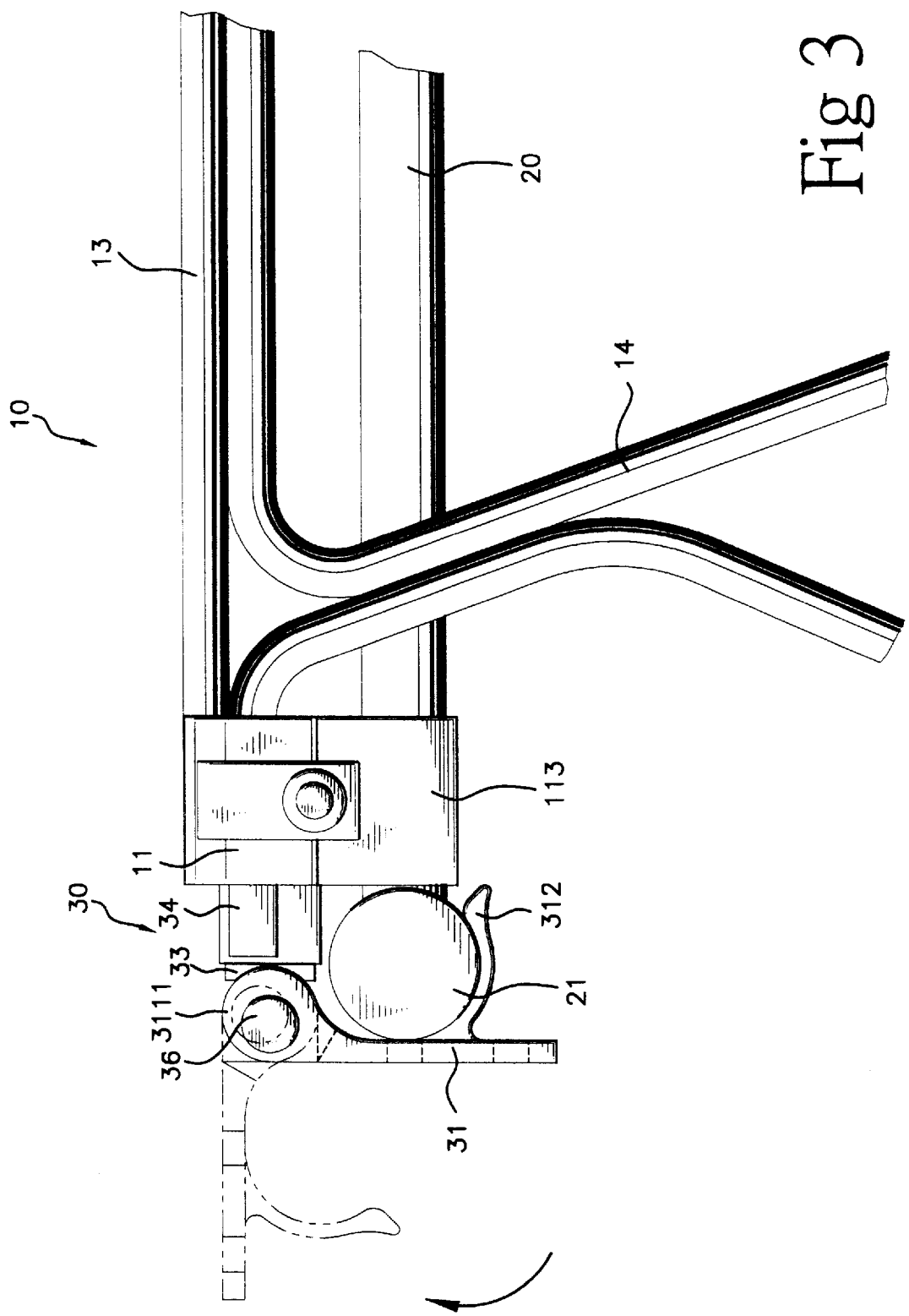
FIG. 3 is a side view to show a quick-release of the lock securing device is operated (phantom lines) to release a U-shackle lock beneath the rack.

The head portion 21 of the U-shackle lock is supported by the curved tongue 312 with the U-shaped body 20 supported by the two hook portions 112, 113 so that the lock is disposed beneath the rack 10. The adjusting member 35 can adjust a distance between the lugs 311 and the frame 11 so as to accommodate the head portions 21 with different sizes. Referring to FIG. 3, when pivoting upwardly the handle 31 about the rivet 36, the protrusion portions 311 are rotated to be received in the curved surface 330 and the distance between the lugs 311 and the frame 11 is slightly increase as known in any conventional quick-release, so that the curved tongue 312 is disengaged from the head portion 21 and the U-shackle lock can be taken from the rack 10.

Accordingly, the operation of the lock securing device of the present invention is very simple, an operator (not shown) simply pulls the handle 31 upwardly to disengage the curved tongue 312 from the head portion 21 of the lock, then he can take the lock from the rack 10. This action is completed within few seconds without any special skill.

Figure 4:
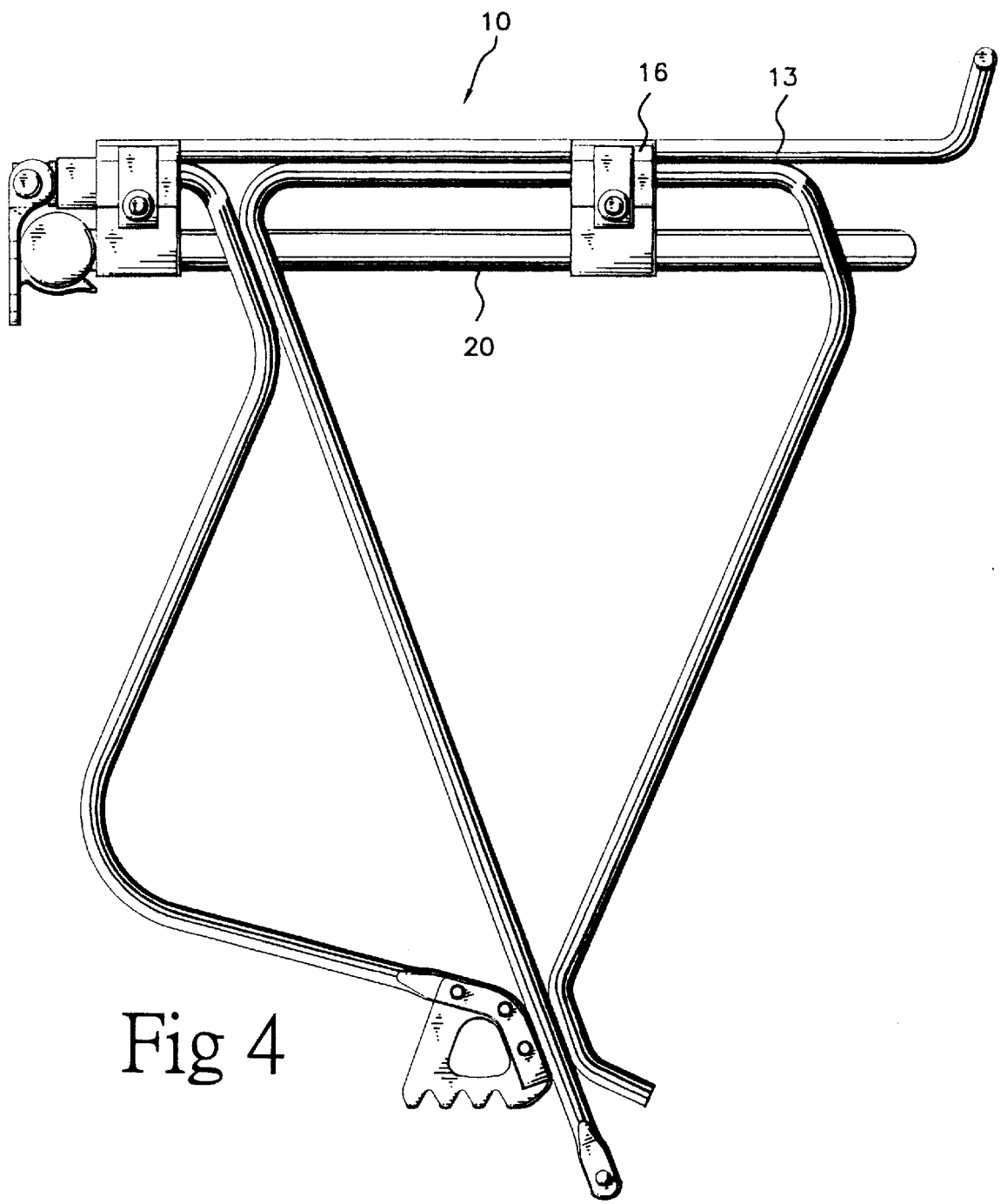
FIG. 4 is another embodiment of the lock securing device wherein two second hook portions extend from the rack.

Referring to FIG. 4, if the U-shaped body 20 is a little bit long, there may further have two second hook portions 16 extending from the rails 12, 13 near a seat tube (not shown) so as to provide a better positioning feature.

Although the invention has been explained in relation to its preferred embodiment, it is to be understood that many other possible modifications and variations can be made without departing from the spirit and scope of the invention as hereinafter claimed.

What is claimed is:

1. A lock securing device for a bicycle, comprising:

a frame being able to be disposed to a rack of said bicycle and having a tubular member disposed to an underside thereof, said frame having two hook portions respectively disposed to two ends thereof;

a quick-release means having a handle which has two lugs extending from one of two ends thereof and each of said lugs has an eccentric hole defined therethrough so as to form a protrusion portion, a curved tongue extending laterally from said handle and near the other end of said handle, an activating rod having a first end thereof pivotally connected between said two lugs and a second end thereof with an outer threaded periphery which movably inserted through said tubular member, an engaging member movably mounted to said activating rod and having a curved surface for receiving said protrusion portions of said lugs, and an adjusting member threadedly engaged with said outer threaded periphery of said activating rod which is inserted through said tubular member.

2. The lock securing device as claimed in claim 1 wherein said engaging member includes a washer and a receiving member which has a recess defined in an end thereof for receiving said washer therein, said curved surface defined in one end of said washer.

3. The lock securing device as claimed in claim 1 further comprising two second hook portions being able to extend from said rack.

* * * * *